Patented Jan. 5, 1937

2,066,731

UNITED STATES PATENT OFFICE 2,066,731

NEUTRAL WATER-SOLUBLE COMPLEX COMPOUNDS

Walter Kropp, Wuppertal-Elberfeld, Germany, assignor to Winthrop Chemical Company, Inc., New York, N. Y., a corporation of New York No Drawing. Application September 17, 1935, Serial No. 40,997. In Germany October 4, 1934

5 Claims. (Cl. 260—62)

This invention relates to neutral water-soluble complex compounds containing 1,3-dimethyl-xanthene and a water-soluble salt of meta-hydroxybenzoic acid.

1,3-dimethylxanthene is known to be a valuable therapeutic agent. It has already been suggested to prepare compounds containing 1,3-dimethylxanthene and mono- or triethanolamine, but these compounds have proved unsuitable for therapeutic application. Particularly the compound containing 1,3-dimethylxanthene and triethanolamine is too insoluble to be administered, for instance by injection. The same holds true with compounds containing 1,3-dimethylxanthene and an alkali benzoate. The compound prepared by reacting one mol. of 1,3-dimethylxanthene with two mols of diethanolamine is relatively readily soluble in water, but displays certain disadvantages when applied by injection. The latter compound reacts strongly alkaline for its content of diethanolamine and therefore causes serious irritations when injected, for instance, subcutaneously or intramuscularly. Also compounds containing 1,3-dimethylxanthene and sodium salicylate have been proposed for therapeutic administration, but their application is restricted in so far as they cannot be administered to persons with weakened blood circulation, since the known compounds injuriously affect the heart.

According to the present invention it has been established that neutral compounds containing 1,3-dimethylxanthene and a water-soluble salt of meta-hydroxybenzoic acid are free from the said disadvantages and easily to be administered. Especially compounds containing one mol. of 1,3-dimethylxanthene and two mols of an alkali or magnesium salt of meta-hydroxybenzoic acid have proved suitable. For the practical use I prefer the compound containing one mol of 1,3-dimethylxanthene and two mols of sodium meta-hydroxybenzoate.

The compounds containing 1,3-dimethylxanthene and a water-soluble salt of meta-hydroxybenzoic acid are readily soluble in water with neutral reaction, insoluble in ether, petroleum ether and benzene. In the dry state they are white and crystalline. Their taste is not alkaline, but sweetish with a bitter after-taste. Because of their neutral reaction, their solutions in a nonirritating solvent can be injected without causing any irritations. They can also be worked with fats, for instance, cocoa-butter to suppositories which for the neutral reaction of my compounds are stable on storage. The neutral compounds containing 1,3-dimethylxanthene and a water-soluble salt of meta-hydroxybenzoic acid do not display any noxious by-actions even when applied to persons with a weakened blood circulation. Since the water-soluble salts of meta-hydroxybenzoic acid are practically indifferent in pharmacological respect, the toxicity of my compounds corresponds only to their contents of 1,3-dimethylxanthene. They are therefore less toxic than the hitherto used compounds containing 1,3-dimethylxanthene and salicylic acid or diethanolamine. They are thus favorably distinguished in every respect from the hitherto used compounds of 1,3-dimethylxanthene.

The neutral compounds of 1,3-dimethylxanthene and a water-soluble salt of meta-hydroxybenzoic acid can be prepared by reacting upon 1,3-dimethylxanthene a water-soluble salt of meta-hydroxybenzoic acid in the presence of a solvent, for instance, water. The water-soluble salts of meta-hydroxybenzoic acid as well as the 1,3-dimethylxanthene may also be prepared in the reaction mixture, for example 1,3-dimethylxanthene may be caused to react with meta-hydroxybenzoic acid with the addition of such an amount of a base that the reaction mixture gets a neutral reaction. Also the salts of 1,3-dimethylxanthene, for instance, its alkali salts, can react with a salt of meta-hydroxybenzoic acid with the addition of one equivalent of a stronger acid than meta-hydroxybenzoic acid, for instance, carbonic, acetic lactic, phosphoric or sulfuric acid, so that the reaction mixture becomes neutral. For the preparation of the compounds containing one mol. of 1,3-dimethylxanthene and two mols of a water-soluble salt of meta-hydroxybenzoic acid, I cause one mol. of 1,3-dimethylxanthene to react with two mols of a water-soluble salt of meta-hydroxybenzoic acid, whereby I wish it to be understood that the water-soluble salt of meta-hydroxybenzoic acid or the 1,3-dimethylxanthene may be produced in the reaction mixture.

The capability of the salts of the meta-hydroxybenzoic acid to yield readily soluble complex compounds with 1,3-dimethylxanthene is surprising in so far as it is known that the complex-forming properties of the aliphatic and aromatic polyhydroxy compounds and hydroxy-carboxylic acids are based on the ortho-position of the hydroxyl groups or of the hydroxyl and carboxyl groups.

The invention is illustrated by the following example without being restricted thereto, the parts being by weight:

*Example.*—32 parts of sodium meta-hydroxybenzoate are dissolved in 100 parts of water. 18 parts of 1,3-dimethylxanthene are stirred into the solution. The clear reaction mixture can be used immediately. The complex compound formed can be obtained by evaporation.

If the components are dissolved in 50 parts by weight of hot water instead of 100 parts of water, the new compound crystallizes out in the form of fine needles, particularly on vaccinating and cooling.

Instead of the sodium salt also other salts of the meta-hydroxybenzoic acid, such as the lithium, potassium and magnesium salt, can be used. It is also possible to cause one mol. of sodium meta-hydroxybenzoate and one mol. of free meta-hydroxybenzoic acid to react with the sodium salt of 1,3-dimethylxanthene.

I claim:

1. As new products complex compounds of 1,3-dimethylxanthene and a water-soluble salt of m-hydroxybenzoic acid, which products are white and crystalline, very easily soluble in water with neutral reaction, insoluble in ether, petroleum ether and benzene, and which display a sweetish taste with a bitter after-taste.

2. As new products complex compounds of 1,3-dimethylxanthene and a water soluble salt selected from the group consisting of alkali metal and magnesium m-hydroxybenzoates, which products are white and crystalline, very easily soluble in water with neutral reaction, insoluble in ether, petroleum ether and benzene, and which display a sweetish taste with a bitter after-taste.

3. As new products complex compounds of one mol. of 1,3-dimethylxanthene and two mols of a water-soluble salt of m-hydroxybenzoic acid, which products are white and crystalline, very easily soluble in water with neutral reaction, insoluble in ether, petroleum ether and benzene, and which display a sweetish taste with a bitter after-taste.

4. As new products complex compounds of one mol. of 1,3-dimethylxanthene and two mols of a water-soluble salt selected from the group consisting of alkali metal and magnesium m-hydroxybenzoates, which products are white and crystalline, very easily soluble in water with neutral reaction, insoluble in ether, petroleum ether and benzene, and which display a sweetish taste with a bitter after-taste.

5. As new products complex compounds of one mol. of 1,3-dimethylxanthene and two mols of sodium m-hydroxybenzoate.

WALTER KROPP.